(No Model.)

H. DELZELL.
FLOWER POT.

No. 579,295. Patented Mar. 23, 1897.

Witnesses
L. M. Gillis
K. A. Nau

Inventor
Hattie Delzell,
by John Wedderburn
Attorney

UNITED STATES PATENT OFFICE.

HATTIE DELZELL, OF JACKSON, CALIFORNIA.

FLOWER-POT.

SPECIFICATION forming part of Letters Patent No. 579,295, dated March 23, 1897.

Application filed June 27, 1896. Serial No. 597,161. (No model.)

*To all whom it may concern:*

Be it known that I, HATTIE DELZELL, a citizen of the United States, residing at Jackson, in the county of Amador and State of California, have invented certain new and useful Improvements in Flower-Pots; and I do hereby declare the following to be a full, clear, and exact description of the invention, such as will enable others skilled in the art to which it appertains to make and use the same.

This invention relates to certain new and useful improvements in flower-pots; and it has for its object, among others, to provide a pot of simple and cheap construction by which the plants may be readily transferred from one pot to another or from the pot to the garden without danger of injury to the roots thereof. I preferably form the pot-body in two parts and the bottom separated therefrom and detachably secure the same therewith. The pot and the pan in which it is designed to rest may be formed of pottery or of wood or metal; but if wood should be painted on the inside to prevent decay.

Other objects and advantages of the invention will hereinafter appear, and the novel features thereof will be particularly pointed out in the appended claims.

The invention is clearly illustrated in the accompanying drawings, which, with the letters of reference marked thereon, form a part of this specification, and in which—

Figure 1:
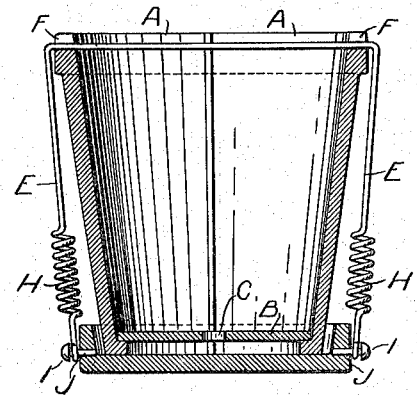
Figure 2:
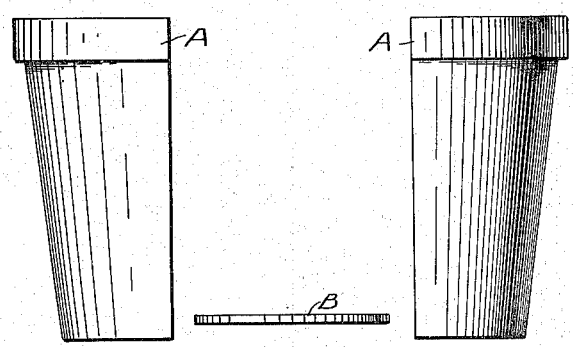
Figure 3:
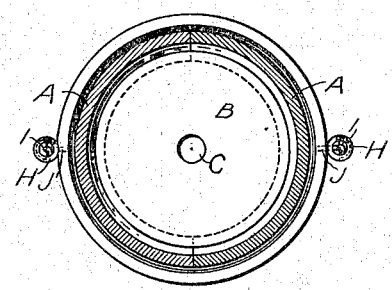

Figure 1 is a vertical section through the improved flower-pot. Fig. 2 is a view showing the parts of the pot proper separated, but in their relative positions. Fig. 3 is a cross-section.

Like letters of reference indicate like parts in the several views.

Referring now to the details of the drawings by letter, the pot proper is composed of the two like parts A A and the separable bottom B, provided with an opening C, as usual, the lower ends of the two parts of the body portion being formed with the rim or flange extending inwardly, as shown, and upon which flange the bottom B rests. When the pot is taken apart, the earth inclosed therein will rest upon the bottom, by which it may be carried to the desired place and put into the ground or into another pot, if desired. The two parts of the body portion may be held together in any suitable manner, preferably by a wire or stout cord E, passed around the same and held in the notch F at each end thereof, as shown. When the wire is slipped off of the pot out of the notch, the body portion may be removed from the bottom without disturbing the roots of the plant in any manner. This wire is provided with springs H, which are attached to pins or projections I on the pan J and serve to hold the wire normally down, but permit its movement when necessary to remove the same from the body portion.

The advantages of a flower-pot constructed in accordance with my invention will be readily appreciated by those who have had any experience in transplanting plants. The plants are not injured in the least and the facility with which they are removed recommends its adoption.

Modifications in details may be resorted to without departing from the spirit of the invention or sacrificing any of its advantages.

Having thus described the invention, what is claimed as new is—

1. A flower-pot formed in sections with a removable bottom, means for holding them in position including a cross-bar seated in notches at the upper ends of said sections and extending downward upon opposite sides and having spring portions, and a pan to which the same are connected, substantially as described.

2. A flower-pot formed in sections and provided with a removable bottom, a wire held in notches at the upper edge of the sections, a pan for holding the same and springs connecting said pan with the ends of said wire, all substantially as described.

In testimony whereof I have signed this specification in the presence of two subscribing witnesses.

HATTIE DELZELL.

Witnesses:
L. G. KEENEY,
W. E. KENT.